US009625978B2

(12) United States Patent
Kutch et al.

(10) Patent No.: US 9,625,978 B2
(45) Date of Patent: Apr. 18, 2017

(54) RECEIVING, AT LEAST IN PART, AND/OR ISSUING, AT LEAST IN PART, AT LEAST ONE PACKET TO REQUEST CHANGE IN POWER CONSUMPTION STATE (71) Applicant: Intel Corporation, Santa Clara, CA (US)

(72) Inventors: Patrick G. Kutch, Tigard, OR (US); Brian P. Johnson, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 13/908,367

(22) Filed: Jun. 3, 2013

(65) Prior Publication Data
US 2014/0359334 A1 Dec. 4, 2014

(51) Int. Cl.
*G06F 1/32* (2006.01)
*H04L 12/64* (2006.01)

(52) U.S. Cl.
CPC .......... *G06F 1/3287* (2013.01); *G06F 1/3206* (2013.01); *G06F 1/3278* (2013.01); *H04L 12/6418* (2013.01); *Y02B 60/126* (2013.01); *Y02B 60/1282* (2013.01); *Y02B 60/32* (2013.01)

(58) Field of Classification Search
CPC ........ G06F 1/3234; G06F 1/3237; G06F 1/32; H04L 12/6418
See application file for complete search history.

(56) References Cited

U.S. PATENT DOCUMENTS

| 7,317,732 | B2 * | 1/2008 | Mills ....................... H04L 12/12 370/445 |
| 8,213,303 | B2 | 7/2012 | Wang |
| 8,332,869 | B2 * | 12/2012 | Stevens, IV ................... 719/315 |
| 8,995,247 | B2 * | 3/2015 | Chappel et al. ............... 370/203 |
| 2009/0133040 | A1 | 5/2009 | Stevens, IV |
| 2010/0069126 | A1 | 3/2010 | Wang |
| 2010/0257386 | A1 | 10/2010 | Hanada |

(Continued)

FOREIGN PATENT DOCUMENTS

CN 101038561 A 9/2007
CN 102150393 A 8/2011
(Continued)

OTHER PUBLICATIONS

"IEEE 1901," Wikipedia article, retrieved from http://en.wikipedia.org/wiki/IEEE_1901 on May 14, 2013 (9 pages).
(Continued)

*Primary Examiner* — Zahid Choudhury
(74) *Attorney, Agent, or Firm* — Christopher K. Gagne (57) ABSTRACT

An embodiment may include circuitry to be included, at least in part, in at least one node to be used in a network. The circuitry may (a) receive, at least in part, via at least one power supply line of the at least one node, at least one packet, and/or (b) issue, at least in part, via the at least one power supply line, the at least one packet. The at least one packet may request at least one change, at least in part, in at least one power consumption state of at least one portion of the at least one node. Many modifications, variations, and alternatives are possible without departing from this embodiment.

21 Claims, 3 Drawing Sheets

(56) References Cited

U.S. PATENT DOCUMENTS

| | | | |
|---|---|---|---|
| 2011/0161695 A1* | 6/2011 | Okita | G06F 1/3209 713/310 |
| 2013/0138980 A1* | 5/2013 | Wang | H04L 12/6418 713/300 |
| 2013/0163437 A1* | 6/2013 | Gao | 370/242 |
| 2014/0301198 A1* | 10/2014 | Louzoun et al. | 370/235 |

FOREIGN PATENT DOCUMENTS

| | | |
|---|---|---|
| JP | 2003304653 A | 10/2003 |
| JP | 2010103890 A | 5/2010 |
| JP | 2010258549 A | 11/2010 |
| WO | 2009044546 A1 | 4/2009 |

OTHER PUBLICATIONS

"Intelligent Platform Management Interface," Wikipedia article, retrieved from http://en.wikipedia.org/wiki/Intelligent_Platform_Management_Interface on May 14, 2013 (7 pages).

"Cable Reduction Technology Utilizing Power Line Networking for Server Management," IP.com Disclosure No. IPCOM000022485D, publication date Mar. 17, 2004 (2 pages).

Office Action (including search report) in Taiwanese patent application No. 103116821 dated Sep. 24, 2015 (8 pages, with 1 page English translation of search report).

Notice of Reasons for Rejection in Japanese patent application No. 2014-098830 dated Jun. 9, 2015 (1 page, with 3 pages organized English translation).

Section 11, Interoperability and Power Delivery, Universal Serial Bus 3.0 Specification, Rev. 1.0, dated Jun. 6, 2011, 13 pages.

Final Notice of Reasons for Rejection in Japanese Patent Application No. 2014-098830, dated Jan. 26, 2016 (3 pages, with 2 pages summarized, organized English Translation).

Office Action dated May 24, 2016 in Taiwanese Patent Application 103116821 and attached search report (9 pages, with 1 page English translation of search report).

Office Action dated Jul. 20, 2016 in Japanese Patent Application 2014-098830 (2 pages, with 1 page summarized organized English translation).

Examiner Report to the Board and Notice of Transmittal to Board dated Jan. 13 and 20, 2017 in Japanese Patent Application 2014-098830 (4 pages with 1 page summarized, organized, partial English translation).

* cited by examiner

RECEIVING, AT LEAST IN PART, AND/OR ISSUING, AT LEAST IN PART, AT LEAST ONE PACKET TO REQUEST CHANGE IN POWER CONSUMPTION STATE

TECHNICAL FIELD

Embodiments disclosed herein generally relate to receiving, at least in part, and/or issuing, at least in part, at least one packet to request at least one change in at least one power consumption state of at least one portion of at least one node in a network.

BACKGROUND

In one conventional network, in order to reduce the power consumption of a server in the network when the server is inactive, components of the server are placed in relatively reduced power consumption modes of operation (e.g., relative to fully powered-up and/or operational modes of operation). While these components are in these relatively reduced power consumption modes of operation, the server's network interface controller (NIC) is kept in a fully operational and powered-up state in order to permit the NIC to be able to receive and properly process a command from a network administrator that requests that the server return to a fully operational and/or powered-up mode of operation. This is unfortunate, since the NIC typically consumes a relatively large amount of power when it is in its fully operational and/or powered-up state. Accordingly, it would be desirable to be able to place the NIC in a relatively reduced power consumption mode of operation (e.g., in order to be able to reduce further the amount of power consumed by the server), while also providing a mechanism that permits the server to be able to receive and properly process a command that the server return to its fully operational and/or powered-up mode of operation and/or other management commands.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DESCRIPTION OF EMBODIMENTS

Figure 1:
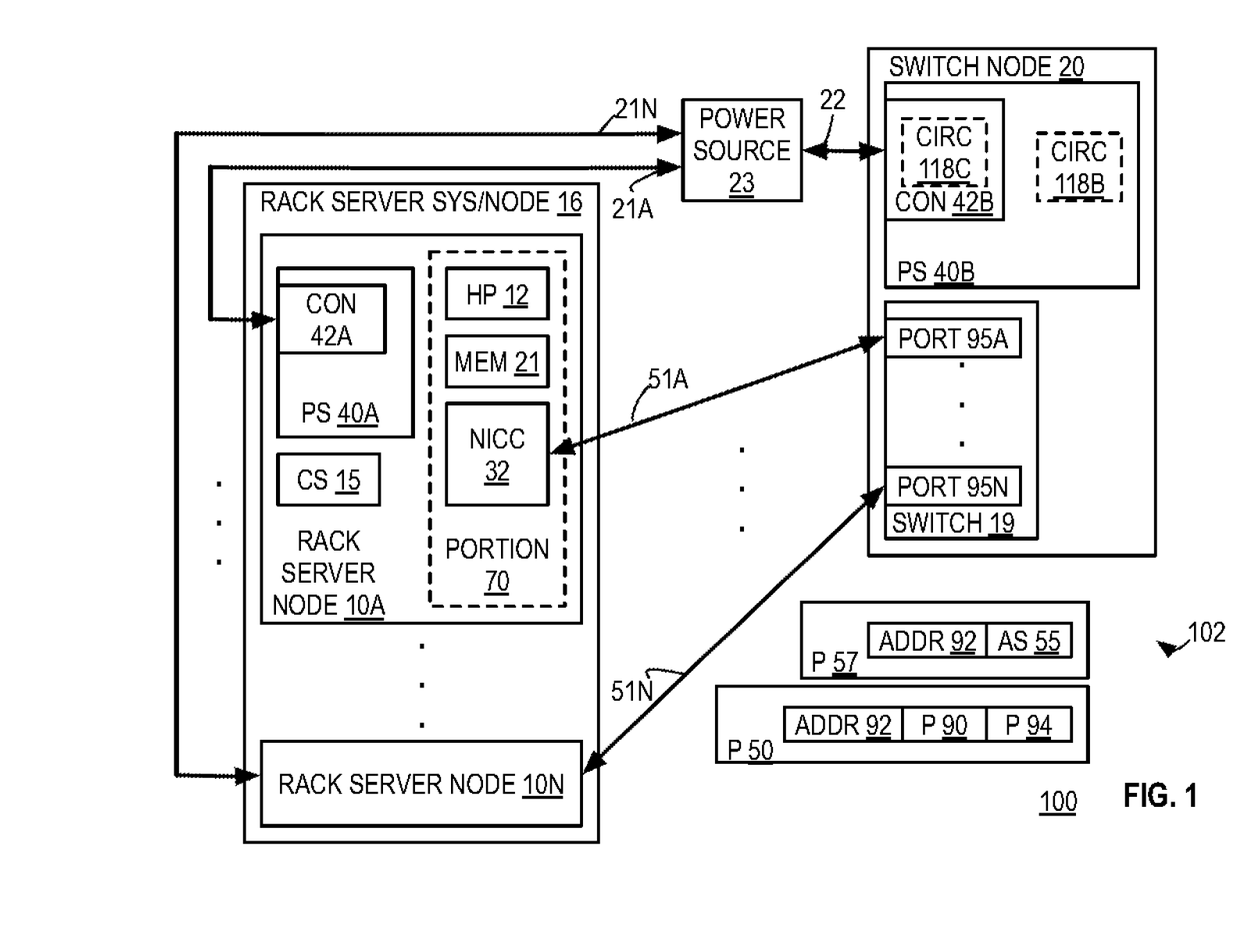
FIG. 1 illustrates elements in an embodiment.

FIG. 1 illustrates a system embodiment 100. System 100 may include, at least in part, network 102. Network 102 may comprise, at least in part, one or more nodes 16 and/or 20. One or more nodes 16 may be communicatively coupled, at least in part, to one or more nodes 20, via one or more (and in this embodiment, as plurality of) network communication links 51A . . . 51N.

In this embodiment, one or more nodes 16 may be or comprise, at least in part, one or more rack server systems that, for example, may comprise one or more (and in this embodiment, a plurality of) rack server nodes 10A . . . 10N. Also, in this embodiment, one or more nodes 20 may be or comprise one or more switch nodes that, for example, may comprise one or more switches 19.

In this embodiment, a rack server system may be or comprise one or more rack server nodes. In this embodiment, a "rack server node" and/or "rack server" may be used interchangeably, and may be or comprise, at least in part, one or more circuit boards, circuit panels, motherboards, daughter boards, and/or blades that may be capable, at least in part, of (1) being communicatively coupled, at least in part, to one or more chassis and/or backplanes, and (2) operating, at least in part, as one or more servers. Also, in this embodiment, a switch node may be or comprise, at least in part, one or more switches. In this embodiment, a switch may be or comprise, at least in part, circuitry capable of receiving, at least in part, and forwarding, at least in part, one or more packets (e.g., via one or more hops) toward one or more destinations of the one or more packets.

In this embodiment, a "computer," "host," "server," "client," and/or "node" may be used interchangeably, and may be or comprise, at least in part, one or more end stations, smart phones, tablet computers, appliances, communication instrumentalities, intermediate stations, network interfaces, clients, servers, storage, mass storage, and/or components and/or portions thereof. In this embodiment, a "network," "channel", "communication link," and/or "communication lane" may be used interchangeably, and may be or may comprise, for example, one or more virtual, physical, and/or logical mechanisms, instrumentalities, modalities, and/or portions thereof that may permit, facilitate, and/or allow, at least in part, two or more entities to be communicatively coupled together, at least in part.

In this embodiment, a first entity may be "communicatively coupled" (at least in part) to a second entity if the first entity is capable, at least in part, of transmitting to and/or receiving from the second entity one or more packets. In this embodiment, a packet may comprise, at least in part, one or more symbols, values, and/or characters that may embody, represent, and/or indicate, at least in part, for example, one or more commands and/or data. Also in this embodiment, a "wireless network" may be or comprise a network that permits, at least in part, at least two entities to be wirelessly communicatively coupled, at least in part. In this embodiment, a "wired network" may be or comprise a network that permits, at least in part, at least two entities to be communicatively coupled, at least in part, via non-wireless means, at least in part. In this embodiment, data may be or comprise one or more commands (for example, one or more program instructions), and/or one or more such commands may be or comprise data. Also in this embodiment, an instruction may include data and/or one or more commands. Similarly, in this embodiment, data may include one or more instructions and/or one or more commands.

In this embodiment, a portion, subset, or component of an entity may comprise all or less than all of the entity. Also in this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. In this embodiment, memory and/or storage each may comprise one or more of the following types of memories: semiconductor firmware memory, programmable memory, non-volatile memory, mass storage, read only memory, electrically programmable memory, random access memory, flash memory, solid state drive memory, hard/fixed disk drive memory, magnetic disk memory, optical disk memory, phase-change memory, and/or other computer-readable and/or writable memory. In this embodiment, mass storage may be or comprise storage that is capable of non-volatile storage of data, and/or from which such data stored therein may be retrieved.

In this embodiment, each of the rack server nodes 10A . . . 10N may be of identical respective construction and/or operation. Alternatively, without departing from this embodiment, the respective construction and/or operation of one or more of the nodes 10A . . . 10N may be different, at least in part, from the respective construction and/or operation of one or more others of these nodes 10A . . . 10N.

For example, in this embodiment, one or more nodes 10A may comprise, at least in part, one or more single and/or multi-core host processor (HP) CPU 12, one or more chipsets (CS) 15, one or more computer-readable/writable memories 21, NIC circuitry (NICC) 32, and/or one or more power supplies 40A. One or more power supplies 40A may comprise, at least in part, one or more power supply line connectors 42A. Also in this embodiment, one or more nodes 20 may comprise, at least in part, in addition to one or more switches 19, one or more power supplies 40B that may comprise, at least in part, one or more power supply line connectors 42B.

Figure 2:
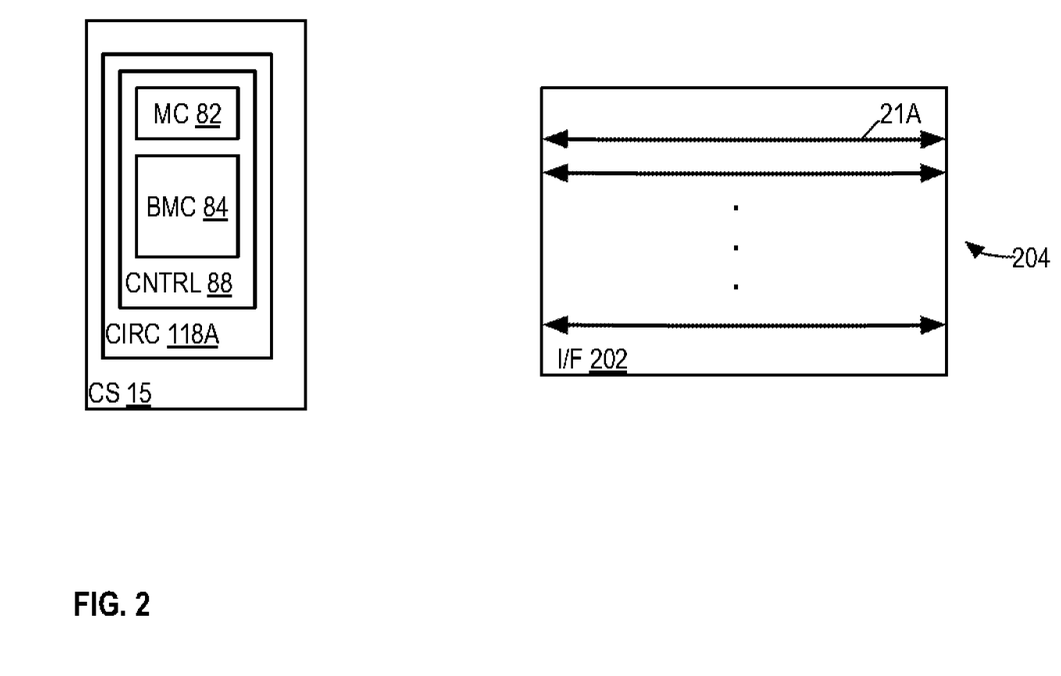
FIG. 2 illustrates elements in an embodiment.

In this embodiment, as shown in FIG. 2, one or more chipsets 15 may comprise, at least in part, circuitry 118A. Circuitry 118A may comprise, at least in part, one or more management controllers 88. In this embodiment, one or more (e.g., management) controllers 88 may comprise, at least in part, one or more management controllers 82 and/or baseboard management controller 84. For example, one or more controllers 82 may be, comprise, and/or be comprised in, at least in part, one or more Intel® Active Management Technology Manageability Engines. Alternatively or additionally, without departing from this embodiment, circuitry 118A, and/or one or more controllers 88, 82, and/or 84 may be comprised, at least in part, in one or more power supplies 40A and/or connectors 42A.

Also in this embodiment, one or more connectors 42B and/or power supplies 40B may comprise, at least in part, circuitry 118C and/or 118B, respectively. Alternatively or additionally, such circuitry 118B and/or 118C may be comprised, at least in part, in one or more other (e.g., not shown) components of one or more nodes 20, such as, for example, one or more not shown chipsets comprised, at least in part, in one or more nodes 20. Circuitry 118B and/or 118C may have, at least in part, identical, similar, or analogous respective constructions, capabilities, and/or operations to those of circuitry 118A. Additionally or alternatively, without departing from this embodiment, circuitry 118B and/or 118C may have, at least in part, different respective constructions, capabilities, and/or operations to those of circuitry 118A.

Each of the nodes 10A . . . 10N may be electrically coupled, at least in part, via one or more respective power supply lines 21A . . . 21N to electrical power source 23. For example, one or more power supplies 40A may be electrically coupled, at least in part, via one or more connectors 42A and/or one or more power supply lines 21A to one or more electrical power sources 23. Analogously, one or more nodes 20 and/or power supplies 40B may be electrically coupled, at least in part, via one or more power supply lines 22 and/or one or more connectors 42B.

In this embodiment, nodes 10A . . . 10N may be communicatively coupled, at least in part, to ports 95A . . . 95N of one or more switches 19 via communication links 51A . . . 51N. For example, NICC 32 of one or more nodes 10A may be communicatively coupled, at least in part, via one or more links 51A to one or more ports 95A of one or more switches 19. Also, for example, one or more nodes 10N may be communicatively coupled, at least in part, to one or more ports 95N via one or more links 51N.

In this embodiment, communication may be carried out between and/or among one or more nodes 10A . . . 10N and/or one or more nodes 20 via one or more links 51A . . . 51N, and/or between one or more systems 16 and/or one or more nodes 20 via one or more links 51A . . . 51N. Such communication may comply and/or be compatible with one or more communication protocols. For example, these one or more communication protocols may comply and/or be compatible with, at least in part, the Ethernet protocol described in Institute of Electrical and Electronics Engineers, Inc. (IEEE) Std. 802.3, 2000 Edition, published on Oct. 20, 2000. Additionally or alternatively, these one or more communication protocols may comply and/or be compatible with the Transmission Control Protocol and/or Internet Protocol described in Internet Engineering Task Force (IETF) Request For Comments (RFC) 791 and/or 793, published September 1981. Of course, many different, additional, and/or other protocols may be used for such data and/or command exchange without departing from this embodiment, including for example, later-developed versions and/or updates of the aforesaid and/or other protocols.

Also, in this embodiment, communication may be carried between and/or among one or more nodes 10A . . . 10N and/or one or more nodes 20 via one or more power lines 21A . . . 21N, power sources 23, and/or power lines 22, and/or between one or more systems 16 and/or one or more nodes 20 via one or more power lines 21A . . . 21N, power sources 23, and/or power lines 22. Such communication may comply and/or be compatible with one or more communication protocols. For example, these one or more communication protocols may comply and/or be compatible with, at least in part, the Broadband over Power Line (BPL) protocol described in IEEE Std. 1901-2010, published in December 2010. Of course, many different, additional, and/or other protocols may be used for such data and/or command exchange without departing from this embodiment, including for example, later-developed versions and/or updates of the aforesaid and/or other protocols.

In this embodiment, machine-readable program instructions may be stored, at least in part, in one or more memories 21A, HP 12, chipsets 15, power supplies 40A and/or 40B, connectors 42A and/or 42B, power sources 23, controllers 88, 82, and/or 84, NICC 32, and/or circuitry 118A, 118B, and/or 118C. In operation, these instructions may be accessed and executed by these components. When so accessed and executed, this may result, at least in part, in these respective components performing the respective operations described herein as being performed by these respective components.

In this embodiment, each of the nodes 10A . . . 10N, 16, and/or 20 may comprise one or more not shown respective user interfaces. Each of these not shown user interfaces may comprise one or more not shown respective graphical user interface systems that may comprise, e.g., one or more keyboards, pointing devices, and/or display systems that may permit one or more human users (not shown) to interact with, to input commands and/or data into, to receive data from, and/or to monitor, at least in part, one or more operations of system 100 and/or one or more components thereof.

Figure 3:
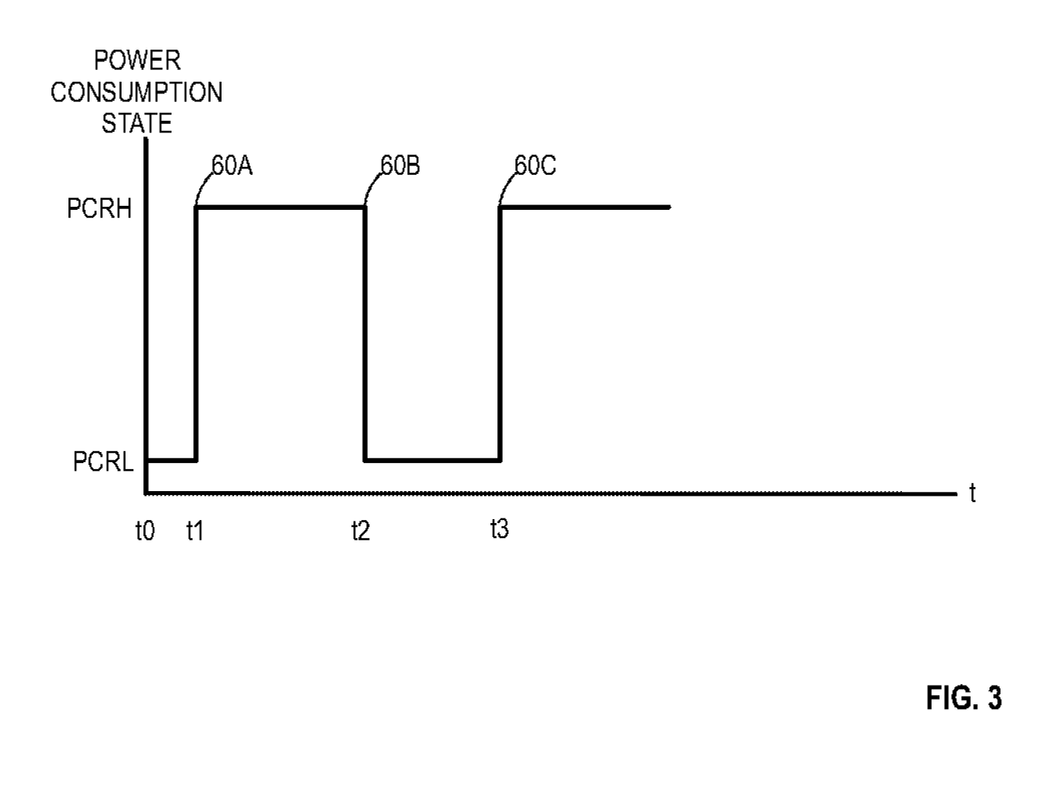
FIG. 3 illustrates elements in an embodiment.

Turning now to FIGS. 1 to 3, prior to being activated (e.g., turned on) at or near time t1 (see FIG. 3), one or more systems 16, one or more nodes 10A, and/or one or more portions 70 of one or more nodes 10A (e.g., comprising one or more HP 12, one or more memories 21, and/or NICC 32) may be in a relatively lower power consumption state (PCRL). In this relatively lower power consumption state PCRL that may prevail from time t0 to time t1, these components of network 102 may be powered-off, or substantially powered-off so as to consume and/or utilize actuating electrical power (e.g., supplied from one or more power sources 23 and/or power supplies 40A) at their lowest possible respective rates without being wholly powered-off. For example, in this substantially powered-off state, one or more components of one or more nodes 10A, such as, one or more power supplies 40A, one or more chipsets 15, circuitry 118A, and/or one or more controllers 88, 82, and/or 84 (and/or one or more components thereof) may be powered-on (at least in part and/or in a standby power state), but all (or substantially all) other components of one or more nodes 10A may be powered-off. Of course, this is merely exemplary, and other respective components of one or more nodes 10A may be powered-on or powered-off when one or more nodes 10A are in the relatively lower power consumption state PCRL without departing from this embodiment.

Thereafter, at or near time t1, one or more portions 70, one or more nodes 10A, and/or one or more systems 16 may be reset and/or powered-on. This may result in these components transitioning to and/or entering (e.g., via one or more transitions 60A) a relatively higher power consumption state (PCRH) relative to the relatively lower power consumption state PCRL. In this relatively higher power consumption state PCRH, all (or substantially all) of the components of one or more nodes 10A may be fully functional and/or operational, and/or may consume and/or utilize actuating electrical power (e.g., supplied from one or more power sources 23 and/or power supplies 40A) at relatively higher respective rates than may be consumed and/or utilized by these components when they were in the relatively lower power consumption state PCRL.

Thereafter, one or more portions 70, one or more nodes 10A, and/or one or more systems 16 may enter into an idle condition. In this embodiment, an idle condition may be or comprise a time period in which one or more processing capabilities of an entity are being utilized to a lesser degree or extent than the entity may be actually or theoretically capable of performing. This may result, at least in part, in one or more portions 70, one or more nodes 10A, and/or one or more systems 16 indicating, at least in part, such idle condition to one or more chipsets 15, circuitry 118A, and/or one or more controllers 88, 82, and/or 84. Additionally or alternatively, one or more chipsets 15, circuitry 118A, and/or one or more controllers 88, 82, and/or 84 may be capable of detecting and/or determining, at least in part, such idle condition. In either or both of these cases, this may result, at least in part, in one or more chipsets 15, circuitry 118A, and/or one or more controllers 88, 82, and/or 84 requesting, at least in part, that one or more portions 70, one or more nodes 10A, and/or one or more systems 16 transition to and/or enter relatively lower power consumption state PCRL. This may result in one or more portions 70, one or more nodes 10A, and/or one or more systems 16 transitioning to and/or entering into (e.g., via one or more transitions 60B) relatively lower power consumption state PCRL.

While one or more portions 70 are in this relatively lower power consumption state PCRL, NICC 32 may be powered-off, at least in part, and accordingly, this may render communication via NICC 32 and/or one or more links 51A infeasible and/or inoperative.

Prior to, after, and/or contemporaneously with one or more chipsets 15, circuitry 118A, and/or one or more controllers 88, 82, and/or 84 making such request, and/or one or more portions 70, one or more nodes 10A, and/or one or more systems 16 transitioning to and/or entering relatively lower power consumption state PCRL, one or more chipsets 15, circuitry 118A, and/or one or more controllers 88, 82, and/or 84 may communicate with one or more nodes 20 by generating and/or issuing, at least in part, one or more packets 57 to one or more nodes 20 via one or more power supplies 40A, connectors 42A, power lines 21A, power sources 23, and/or power lines 22. One or more packets 57 may comprise and/or indicate, at least in part, availability status information 55 and/or one or more addresses 92. Information 55 may indicate, at least in part, the availability status of one or more portions 70, NICC 32, one or more links 51A . . . 51N, one or more nodes 10A, and/or one or more systems 16. For example, information 55 may indicate, at least in part, that one or more portions 70 and/or NICC 32 are currently in the relatively lower power consumption state PCRL (e.g., powered-off, at least in part), inoperative, and/or otherwise incapable of processing, sending, and/or receiving network traffic (e.g., one or more packets) via one or more links 51A. Also, for example, one or more addresses 92 may be or comprise, at least in part, one or more Ethernet medium access control (MAC) and/or internet protocol (IP) addresses that may address, at least in part, circuitry 118A, and/or one or more controllers 88, 82, and/or 84 (e.g., instead of addressing NICC 32). Additionally or alternatively, however, without departing from this embodiment, one or more addresses 92 may address, at least in part, NICC 32 and/or one or more other components of one or more nodes 10A and/or systems 16.

One or more packets 57 may be received, at least in part, at one or more connectors 42B, and/or circuitry 118B and/or 118C. In response to and/or based upon, at least in part, one or more packets 57, information 55, and/or the availability status indicated, at least in part, by such information 55, circuitry 118B and/or 118C may request, at least in part, that one or more nodes 20 conduct, at least in part, further communication with one or more nodes 10A via BPL protocol, using one or more power supplies 40B, connectors 42B, power lines 22, power sources 23, power lines 21A, connectors 42A, and/or power supplies 40A. This may result, at least in part, in such further communication being so conducted. This may also result, at least in part, in one or more nodes 20 and/or switches 19 transitioning to and/or powering-off, at least in part, one or more ports 95A (and/or one or more other portions of one or more nodes 20 and/or switches 19) that may no longer be involved in active communication with one or more nodes 10A and/or NICC 32 (e.g., as a result of entry of one or more portions 70 and/or nodes 10A into relatively lower power consumption state PCRL). Advantageously, this may further reduce power consumption of system 100, network 102, one or more switches 19, and/or one or more nodes 20.

For example, as a result, at least in part, of such further communication being so conducted, instead of network traffic being propagated via one or more links 51A to NICC 32, network traffic that may be transmitted from one or more nodes 20 that may be destined for one or more nodes 10A may be issued, at least in part, from one or more nodes 20 to one or more nodes 10A using, at least in part, BPL protocol, and/or via one or more power supplies 40B, connectors 42B, power lines 22, power sources 23, power lines 21A, connectors 42A, and/or power supplies 40A. Such traffic may be addressed to, at least in part, one or more addresses 92, and/or, after being received, at least in part, by one or more connectors 42A and/or power supplies 40A, may be processed, at least in part, by circuitry 118A, and/or one or more controllers 88, 82, and/or 84.

Depending upon the amount of network traffic that may be received by one or more nodes 20 and/or switches 19 that may be destined for one or more nodes 10A, one or more nodes 20 and/or switches 19 may buffer, at least in part, such traffic for later transmission to one or more nodes 10A via such BPL protocol communication and/or (e.g., at a subsequent time during which one or more portions 70 and/or one or more nodes 10A may be operating, at least in part, in relatively higher power consumption state PCRH) via one or more links 51A. Additionally or alternatively, if such the buffered amount of such network traffic reaches a threshold and/or other criteria are met (e.g., the received traffic is of sufficiently high priority), circuitry 118B and/or 118C, and/or one or more nodes 20 may generate and/or issue, at least in part, one or more packets 50 to circuitry 118A, and/or one or more controllers 88, 82, and/or 84, via one or more power supplies 40B, connectors 42B, power lines 22, power sources 23, power lines 21A, connectors 42A, and/or power supplies 40A. Contemporaneously with, at least in part, generation and/or issuance of one or more packets 50, one or more nodes switches 19 and/or nodes 20 may request, at least in part, that one or more ports 95A return to fully power-up state from powered-off state.

One or more packets 50 may comprise and/or be addressed to, at least in part, one or more address 92. One or more packets 50 may request, at least in part, one or more changes, at least in part, in one or more power consumption states of one or more portions 70 of one or more nodes 10A. For example, one or more packets 50 may comprise, at least in part, one or more packets 90 and/or one or more packets 94. One or more packets 90 may be or comprise, at least in part, one or more wake on local area network (LAN) packets addressed (as one or more destination addresses) to one or more addresses 92. One or more packets 94 may be or comprise, at least in part, one or more Intelligent Platform Management Interface (IPMI) over LAN packets addressed (as one or more destination addresses) to one or more addresses 92. One or more packets 94 may comply or be compatible with, at least in part, Intelligent Platform Management Interface Second Generation Specification v2.0, revision 1.0, published by Intel Corporation et al., 2009. Of course, one or more packets 92 and/or 94 may comply and/or be compatible with other and/or additional protocols without departing from this embodiment.

One or more packets 50, 90, and/or 94 may request, at least in part, that circuitry 118A, and/or one or more controllers 88, 82, and/or 84 initiate, at least in part, one or more changes, at least in part, in one or more power consumption states of one or more portions 70 of one or more nodes 10A. For example, if one or more portions 70 are currently in relatively lower power consumption state PCRL, one or more packets 50, 90, and/or 94 may request, at least in part, that circuitry 118A, and/or one or more controllers 88, 82, and/or 84 initiate, at least in part, transition to and/or entry into, at least in part, relatively higher power consumption state PCRH of one or more portions 70. Conversely, if one or more portions are currently in relatively higher power consumption state PCRH, one or more packets 50, 90, and/or 94 may request, at least in part, that circuitry 118A, and/or one or more controllers 88, 82, and/or 84 initiate, at least in part, transition to and/or entry into, at least in part, relatively lower power consumption state PCRL of one or more portions 70.

Circuitry 118A and/or one or more controllers 88, 82, and/or 84 may receive, at least in part, one or more packets 50, 90, and/or 94. In response to and/or based upon, at least in part, one or more packets 50, 90, and/or 94, circuitry 118A, and/or one or more controllers 88, 82, and/or 84 may initiate, at least in part, these one or more requested changes in power consumption state of the one or more portions 70.

For example, if one or more portions 70 are currently in relatively lower power consumption state PCRL, in response to and/or based upon, at least in part, one or more packets 50, 90, and/or 94, circuitry 118A, and/or one or more controllers 88, 82, and/or 84 may initiate, at least in part, transition to and/or entry into, at least in part, relatively higher power consumption state PCRH of one or more portions 70. This may involve, at least in part, circuitry 118A, and/or one or more controllers 88, 82, and/or 84 requesting, at least in part, that components (e.g., one or more HP 12, memory 21, and/or NICC 32) comprised, at least in part, in one or more portions 70 transition to and/or enter into (via one or more transitions 60C) relatively higher power consumption state PCRH from relatively lower power consumption state PCRL. In this example, this may result, at least in part, in one or more portions 70 fully powering-on, and/or becoming fully powered-on, from their powered-off state.

Additionally or alternatively, in response to and/or based upon, at least in part, one or more packets 50, 90, and/or 94, one or more controllers 82 may initiate, at least in part, powering-up, at least in part, of one or more controllers 84. For example, without departing from this embodiment, when one or more portions 70 are in the relatively lower power consumption state PCRL, one or more controllers 84 also may be, at least in part, in the relatively lower power consumption state PCRL, but one or more controllers 82 may be, at least in part, in the relatively higher power consumption state PCRH. Accordingly, in response to and/or based upon, at least in part, one or more packets 50, 90, and/or 94, one or more controllers 82 may request, at least in part, transition to and/or entry into, at least in part, relatively higher power consumption state PCRH of one or more controllers 84. In response to, at least in part, this request, one or more controllers 84 may transition to and/or enter into, at least in part, relatively higher power consumption state PCRH. After one or more controllers 84 have entered into, at least in part, relatively higher power consumption state PCRH, one or more controllers 84 may request, at least in part, that one or more portions 70 transition to and/or enter into, at least in part, relatively higher power consumption state PCRH. This may result, at least in part, in one or more portions 70 entering into the relatively higher power consumption state PCRH (e.g., fully powered-on state). After one or more portions 70 have entered into the relatively higher power consumption state PCRH, (1) communication may be carried out, at least in part, between one or more nodes 10A and/or 20 using NICC 32, one or more links 51A, and/or one or more switch ports 95A, and/or (2) circuitry 118A and/or one or more controllers 88, 82, and/or 84 may indicate, at least in part, to one or more nodes 20 and/or circuitry 118B and/or 118C that further communication may be carried out, at least in part, via one or more links 51A.

Although only two relatively different power consumption states are presented in this example, it should be understood that more than two such relatively different power consumption states may be employed to advantage. Indeed, in practical implementation of this embodiment, one or more portions 70 may be controlled by circuitry 118A, 118B, and/or 118C and/or one or more controllers 88, 82, and/or 84 to transition to and/or enter into many relatively different levels of power consumption.

Alternatively or additionally, as shown in FIG. 2, in this embodiment, one or more Universal Serial Bus (USB) and/or Thunderbolt™ interfaces 202 may be employed that may comprise, at least in part, one or more power supply lines 21A and/or other signal lines 204. For example, if one or more interfaces 202 comprise one or more USB compatible or compliant interfaces, then one or more interfaces 202 may comply and/or be compatible with, at least in part, USB Power Delivery Specification, Revision 1.1, published 31 Oct. 2012, Intel Corporation et al. In this arrangement, such interfaces 202 may be replicated and/or daisy-chained, at least in part, between or among the server nodes 10A . . . 10N and/or rack system 16 so as to permit power to be supplied from the one or more power sources 23 to the nodes 10A . . . 10N and/or rack system 16 via such replicated and/or daisy-chained interfaces. Of course, many alternative arrangements are possible, including, without limitation, other interface protocols, configurations, and/or power delivery techniques, without departing from this embodiment.

Thus, in a first example in this embodiment, an apparatus may be provided that may be used in association with at least one node that may be used in a network. The apparatus may comprise circuitry that may (a) receive, at least in part, via one or more power supply lines of the one or more nodes, one or more packets to request, at least in part, one or more changes, at least in part, in one or more power consumption states of one or more portions of the one or more nodes, and/or (b) issue, at least in part, via the one or more power supply lines, the one or more packets.

In a second example of this embodiment that may comprise some or all of the elements of the first example, the circuitry may be comprised, at least in part, in (1) one or more switch nodes that may be communicatively coupled to a plurality of server nodes, and/or (2) at least one of server nodes. The one or more switch nodes may be communicatively coupled, at least in part, to the at least one of the server nodes via both the one or more power supply lines and one or more network communication links. The one or more portions may comprise, at least in part, network interface controller circuitry of the at least one of the server nodes. The network interface controller circuitry may be communicatively coupled, at least in part, to the one or more switch nodes via the one or more network communication links.

In a third example of this embodiment that may comprise some or all of the elements of the first and/or second examples, the one or more changes may comprise (a) transitioning, at least in part, to a relatively lower power consumption state of the one or more portions from a relatively higher power consumption state of the one or more portions, and/or (b) transitioning, at least in part, to the relatively higher power consumption state from the relatively lower power consumption state. The relatively lower power consumption state may be relative to the relatively higher power consumption state. In this third example, the circuitry may be comprised, at least in part, in at least one power supply and/or at least one power connector.

In a fourth example of this embodiment that may comprise some or all of the elements of any of the preceding examples, the circuitry may comprise, at least in part, at least one management controller to be comprised, at least in part, in the one or more nodes. The one or more portions may be powered off prior to receipt by the one or more management controllers of the one or more packets. The one or more management controllers may initiate, at least in part, powering on of the one or more portions, in response, at least in part, to the receipt of the one or more packets. The one or more packets may comprise, at least in part, at least one wake on LAN packet addressed, at least in part, to the one or more management controllers and/or at least one IPMI over LAN packet addressed to the one or more management controllers.

In a fifth example of this embodiment that may comprise some or all of the elements of any of the preceding examples, the one or more portions may comprise network interface controller circuitry of the one or more nodes. The network interface controller circuitry may be communicatively coupled to one or more ports of one or more other nodes. The circuitry may indicate, at least in part, to the one or more other nodes availability status of the network interface controller circuitry. Based at least in part upon the availability status, the one or more other nodes may communicate with the one or more nodes via, at least in part, the one or more power supply lines.

In a sixth example of this embodiment that may comprise some or all of the elements of any of the preceding examples, the one or more power supply lines may be comprised, at least in part, in a USB interface. The circuitry may be comprised, at least in part, in a chipset of the one or more nodes. The one or more nodes may comprise at least one of a plurality of rack servers that may be communicatively coupled to at least one switch node.

In a seventh example of this embodiment that may comprise some or all of the elements of the sixth example, the chipset may comprise at least one controller and at least one other controller. In response, at least in part to the one or more packets, the at least one controller may initiate, at least in part, powering on, at least in part, of the at least one other controller. After the powering on, at least in part, of the at least one other controller, the at least one other controller may initiate, at least in part, powering on of the one or more portions.

In an eighth example of this embodiment, computer-readable memory may be provided that may store one or more instructions that when executed by a machine results in the performance of operations that may comprise any combination of any of the operations performed by the circuitry and/or apparatus in any of the preceding examples. In a ninth example of this embodiment, a method is provided that may be implemented, at least in part, in a network. The method of this ninth example may comprise (1) any combination of any of the operations performed by the circuitry and/or apparatus in any of the preceding examples, and/or (2) any combination of any of the operations that may be performed by execution of the one or more instructions stored in the computer-readable memory of the eighth example of this embodiment. In a tenth example of this embodiment, means may be provided to carry out any of, and/or any combination of, the operations that may be performed by the method, apparatus, computer-readable memory, and/or circuitry in any of the preceding examples.

Advantageously, in this embodiment, one or more portions 70 and/or NICC 32 of one or more server nodes may be controllably placed into a relatively reduced power consumption mode of operation (e.g., in order to reduce the amount of power consumed by the one or more server nodes), while the one or more server nodes may be able to receive and/or properly process one or more requests that the one or more portions 70 and/or NICC 32 return to relatively higher power consumption mode of operation (e.g., fully operational and/or powered-up mode of operation) and/or other management commands/requests. Further advantageously, such requests and/or management commands may be propagated via one or more power supply lines, thereby permitting multiple uses of such lines (e.g., for supply of power and such requests/commands).

Many alternatives, modifications, and/or variations are possible without departing from this embodiment. For example, in an eleventh example of this embodiment, machine-readable memory may be provided that may store instructions and/or design data, such as Hardware Description Language, that may define one or more subsets of the structures, circuitry, apparatuses, features, etc. described herein (e.g., in any of the preceding examples of this embodiment). Accordingly, the claims are intended to embrace all such alternatives, modifications, and/or variations.

What is claimed is:

1. An apparatus to be used in association with at least one node to be used in a network, the apparatus comprising:
   a first circuitry to:
     receive, at least in part, via at least one power supply line of the at least one node, at least one packet to request at least one change, at least in part, in at least one power consumption state of at least one portion of the at least one node;
   wherein:
     the at least one change comprises transitioning, at least in part, among multiple mutually different power consumption states of the at least one portion, the multiple mutually different power states comprising more than two relatively different power consumption states of the at least one portion;
     the first circuitry is to generate, at least in part, at least one other packet to be communicated, at least in part, to at least one other node, the at least one other packet including availability status information to indicate, at least in part, availability status of a network interface controller circuitry of the at least one node;
     in response, at least in part, to the at least one other packet, the at least one other node is to:
       communicate with the at least one node via at least one power supply line of the at least one other node;
       power-off, at least in part, at least one switch port of the at least one other node that is no longer to be involved in active communication with the network interface controller circuitry;
     the first circuitry is to be comprised, at least in part, in:
       at least one switch node to be communicatively coupled to a plurality of server nodes, the at least one switch node to be communicatively coupled to at least one of the server nodes via both the at least one power supply line of the at least one other node and at least one network communication link;
     the at least one power supply line of the at least one node and at least one other signal line are comprised, at least in part, in at least one daisy-chained interface that is daisy-chained between the server nodes so as to permit power to be supplied to the server nodes via the at least one daisy-chained interface.

2. The apparatus of claim 1, wherein:
   the first circuitry is also to be comprised, at least in part, in:
     the at least one of the server nodes; and
   the at least one portion comprises the network interface controller circuitry of the at least one of the server nodes that is to be communicatively coupled to the at least one switch node via the at least one network communication link.

3. The apparatus of claim 1, wherein:
   the at least one change comprises:
     transitioning, at least in part, to a powered-on state from a powered-off state; and
   the first circuitry is comprised, at least in part, in at least one of:
     at least one power supply; and
     at least one power connector.

4. The apparatus of claim 1, wherein:
   the first circuitry comprises at least one management controller to be comprised, at least in part, in the at least one node;
   the at least one portion is to be powered off prior to receipt by the at least one management controller of the at least one packet;
   the at least one management controller is to initiate, at least in part, powering on of the at least one portion, in response, at least in part, to the receipt of the at least one packet; and
   the at least one packet comprises, at least in part, at least one of:
     at least one wake on local area network (LAN) packet addressed, at least in part, to the at least one management controller; and
     at least one intelligent platform management interface (IPMI) over LAN packet addressed to the at least one management controller.

5. The apparatus of claim 1, wherein:
   the at least one portion comprises the network interface controller circuitry;
   the network interface controller circuitry is to be communicatively coupled to the at least one port of at least one other node.

6. The apparatus of claim 1, wherein:
   the at least one power supply line of the at least one node is comprised, at least in part, in a universal serial bus interface;
   the first circuitry is comprised, at least in part, in a chipset of the at least one node; and
   the at least one node comprises at least one of a plurality of rack servers that are to be communicatively coupled to the at least one switch node.

7. The apparatus of claim 6, wherein:
   the chipset comprises at least one controller and at least one other controller;
   in response at least in part to the at least one packet, the at least one controller is to initiate, at least in part, powering on, at least in part, of the at least one other controller; and
   after the powering on, at least in part, of the at least one other controller, the at least one other controller is to initiate, at least in part, powering on of the at least one portion.

8. Non-transitory Computer-readable memory storing one or more instructions that when executed by a machine result in performance of operations comprising:

receiving, at least in part, via at least one power supply line of at least one node that is to be used in a network, at least one packet to request at least one change, at least in part, in at least one power consumption state of at least one portion of at least one node;

wherein:
the at least one change comprises transitioning, at least in part, among multiple mutually different power consumption states of the at least one portion, the multiple mutually different power states comprising more than two relatively different power consumption states of the at least one portion;

the operations are to be performed, at least in part, by circuitry;

the circuitry is to generate, at least in part, at least one other packet to be communicated, at least in part, to at least one other node, the at least one other packet including availability status information to indicate, at least in part, availability status of network interface controller circuitry of the at least one node;

in response, at least in part, to the at least one other packet, the at least one other node is to:
communicate with the at least one node via at least one power supply line of the at least one other node;
power-off, at least in part, at least one switch port of the at least one other node that is no longer to be involved in active communication with the network interface controller circuitry;

the circuitry that is to perform, at least in part, the operations is to be comprised, at least in part, in:
at least one switch node to be communicatively coupled to a plurality of server nodes, the at least one switch node to be communicatively coupled to at least one of the server nodes via both the at least one power supply line of the at least one other node and at least one network communication link;

the at least one power supply line of the at least one node and at least one other signal line are comprised, at least in part, in at least one daisy-chained interface that is daisy-chained between the server nodes so as to permit power to be supplied to the server nodes via the at least one daisy-chained interface.

9. The computer-readable memory of claim 8, wherein:
the circuitry that is to perform, at least in part, the operations is also to be comprised, at least in part, in:
the at least one of the server nodes; and
the at least one portion comprises network interface controller circuitry of the at least one of the server nodes, the network interface controller circuitry to be communicatively coupled to the at least one switch node via the at least one network communication link.

10. The computer-readable memory of claim 8, wherein:
the at least one change comprises:
transitioning, at least in part, to a powered-on state from a powered-off consumption state; and
the circuitry that is to perform, at least in part, the operations is comprised, at least in part, in at least one of:
at least one power supply; and
at least one power connector.

11. The computer-readable memory of claim 8, wherein:
the circuitry that is to perform, at least in part, the operations comprises at least one management controller to be comprised, at least in part, in the at least one node;

the at least one portion is to be powered off prior to receipt by the at least one management controller of the at least one packet;

the at least one management controller is to initiate, at least in part, powering on of the at least one portion, in response, at least in part, to the receipt of the at least one packet; and the at least one packet comprises, at least in part, at least one of:
at least one wake on local area network (LAN) packet addressed, at least in part, to the at least one management controller; and
at least one intelligent platform management interface (IPMI) over LAN packet addressed to the at least one management controller.

12. The computer-readable memory of claim 8, wherein:
the at least one portion comprises the network interface controller circuitry;
the network interface controller circuitry is to be communicatively coupled to the at least one port of at least one other node.

13. The computer-readable memory of claim 8, wherein:
the at least one power supply line of the at least one node is comprised, at least in part, in a universal serial bus interface;
the circuitry that is to perform, at least in part, the operations is comprised, at least in part, in a chipset of the at least one node; and
the at least one node comprises at least one of a plurality of rack servers that are to be communicatively coupled to the at least one switch node.

14. The computer-readable memory of claim 13, wherein:
the chipset comprises at least one controller and at least one other controller;
in response at least in part to the at least one packet, the at least one controller is to initiate, at least in part, powering on, at least in part, of the at least one other controller; and
after the powering on, at least in part, of the at least one other controller, the at least one other controller is to initiate, at least in part, powering on of the at least one portion.

15. A method implemented, at least in part, by first circuitry to be used in association with at least one node that is to be used in a network, the method comprising:
receiving, at least in part, via at least one power supply line of the at least one node, at least one packet to request at least one change, at least in part, in at least one power consumption state of at least one portion of the at least one node;

wherein:
the at least one change comprises transitioning, at least in part, among multiple mutually different power consumption states of the at least one portion, the multiple mutually different power states comprising more than two relatively different power consumption states of the at least one portion;

the circuitry is to generate, at least in part, at least one other packet to be communicated, at least in part, to at least one other node, the at least one other packet including availability status information to indicate, at least in part, availability status of network interface controller circuitry of the at least one node;

in response, at least in part, to the at least one other packet, the at least one other node is to:

communicate with the at least one node via at least one power supply line of the at least one other node;

power-off, at least in part, at least one switch port of the at least one other node that is no longer to be involved in active communication with the network interface controller circuitry;

the first circuitry is to be comprised, at least in part, in:
at least one switch node to be communicatively coupled to a plurality of server nodes, the at least one switch node to be communicatively coupled to at least one of the server nodes via both the at least one power supply line of the at least one other node and at least one network communication link;

the at least one power supply line of the at least one node and at least one other signal line are comprised, at least in part, in at least one daisy-chained interface that is daisy-chained between the server nodes so as to permit power to be supplied to the server nodes via the at least one daisy-chained interface.

16. The method of claim 15, wherein:
the first circuitry is also to be comprised, at least in part, in:
the at least one of the server nodes; and
the at least one portion comprises network interface controller circuitry of the at least one of the server nodes, the network interface controller circuitry to be communicatively coupled to the at least one switch node via the at least one network communication link.

17. The method of claim 15, wherein:
the at least one change comprises:
transitioning, at least in part, to a powered-on state from a powered-off state; and
the first circuitry is comprised, at least in part, in at least one of:
at least one power supply; and
at least one power connector.

18. The method of claim 15, wherein:
the first circuitry comprises at least one management controller to be comprised, at least in part, in the at least one node;

the at least one portion is to be powered off prior to receipt by the at least one management controller of the at least one packet;

the at least one management controller is to initiate, at least in part, powering on of the at least one portion, in response, at least in part, to the receipt of the at least one packet; and the at least one packet comprises, at least in part, at least one of:
at least one wake on local area network (LAN) packet addressed, at least in part, to the at least one management controller; and
at least one intelligent platform management interface (IPMI) over LAN packet addressed to the at least one management controller.

19. The method of claim 15, wherein:
the at least one portion comprises the network interface controller circuitry;
the network interface controller circuitry is to be communicatively coupled to the at least one port of at least one other node.

20. The method of claim 15, wherein:
the at least one power supply line of the at least one node is comprised, at least in part, in a universal serial bus interface;
the first circuitry is comprised, at least in part, in a chipset of the at least one node; and
the at least one node comprises at least one of a plurality of rack servers that are to be communicatively coupled to the at least one switch node.

21. The method of claim 20, wherein:
the chipset comprises at least one controller and at least one other controller;
in response at least in part to the at least one packet, the at least one controller is to initiate, at least in part, powering on, at least in part, of the at least one other controller; and
after the powering on, at least in part, of the at least one other controller, the at least one other controller is to initiate, at least in part, powering on of the at least one portion.

* * * * *